United States Patent
Suzuki et al.

(10) Patent No.: US 7,441,083 B2
(45) Date of Patent: Oct. 21, 2008

(54) DATA STORAGE DEVICE MANAGEMENT SYSTEM

(75) Inventors: Katsuyoshi Suzuki, Tokyo (JP); Kenji Muraoka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 388 days.

(21) Appl. No.: 11/109,162

(22) Filed: Apr. 18, 2005

(65) Prior Publication Data

US 2005/0182901 A1 Aug. 18, 2005

Related U.S. Application Data

(63) Continuation of application No. 10/370,865, filed on Feb. 19, 2003, now Pat. No. 6,907,500.

(30) Foreign Application Priority Data

Sep. 5, 2002 (JP) ............... 2002-259519

(51) Int. Cl.
G06F 12/00 (2006.01)
(52) U.S. Cl. .................................... 711/114
(58) Field of Classification Search ................ 711/113, 711/114; 714/42, 48
See application file for complete search history.

(56) References Cited

U.S. PATENT DOCUMENTS

| | | | |
|---|---|---|---|
| 4,817,035 A | 3/1989 | Timsit | |
| 5,034,935 A | 7/1991 | Ishibashi et al. | |
| 5,557,499 A | 9/1996 | Reiter et al. | |
| 5,572,659 A | 11/1996 | Iwasa et al. | |
| 5,586,250 A | 12/1996 | Carbonneau et al. | |
| 5,623,691 A | 4/1997 | Clohset et al. | |
| 5,754,112 A | 5/1998 | Novak | |
| 5,835,700 A | 11/1998 | Carbonneau et al. | |
| 5,880,955 A | 3/1999 | Matoba et al. | |
| 5,913,926 A | 6/1999 | Anderson et al. | |
| 5,956,665 A | 9/1999 | Martinez et al. | |
| 5,966,510 A | 10/1999 | Carbonneau et al. | |
| 6,076,142 A | 6/2000 | Corrington et al. | |
| 6,098,146 A | 8/2000 | Bouvier et al. | |
| 6,101,559 A * | 8/2000 | Schultz et al. | 710/15 |
| 6,223,250 B1 | 4/2001 | Yokono | |
| 6,384,842 B1 | 5/2002 | DeKoning et al. | |
| 6,477,139 B1 * | 11/2002 | Anderson et al. | 370/216 |

(Continued)

FOREIGN PATENT DOCUMENTS

JP 05-081299 4/1993

(Continued)

OTHER PUBLICATIONS

DF500 Disk Array Subsystem User's Guide, 16th Edition, Hitachi, Ltd.

*Primary Examiner*—Hiep T Nguyen
(74) *Attorney, Agent, or Firm*—Townsend and Townsend and Crew LLP

(57) ABSTRACT

A method for managing a storage subsystem including a plurality of information recording media includes selecting at least one recording medium from the plurality of information recording media to perform a service to the selected recording medium. A locating device associated with the selected recording medium is activated to identify the location of the selected recording medium in the storage subsystem.

21 Claims, 11 Drawing Sheets

U.S. PATENT DOCUMENTS

| | | |
|---|---|---|
| 6,487,623 B1 | 11/2002 | Emerson et al. |
| 6,560,729 B1 | 5/2003 | Anuntapong et al. |
| 6,577,912 B1 | 6/2003 | Ueda et al. |
| 6,601,164 B1 * | 7/2003 | Robertson .................. 713/1 |
| 6,651,138 B2 | 11/2003 | Lai et al. |
| 6,714,391 B2 * | 3/2004 | Wilk et al. .................. 361/15 |
| 7,117,141 B2 * | 10/2006 | Kaji et al. .................. 703/21 |
| 2001/0039632 A1 | 11/2001 | MacLaren et al. |
| 2002/0002651 A1 | 1/2002 | MacLaren et al. |
| 2002/0002690 A1 | 1/2002 | Lai et al. |
| 2002/0007447 A1 | 1/2002 | Oue |
| 2002/0053010 A1 | 5/2002 | Piccirillo et al. |
| 2003/0003816 A1 * | 1/2003 | Bolognia et al. ............ 439/894 |
| 2003/0005367 A1 | 1/2003 | Lam |
| 2003/0014587 A1 | 1/2003 | Bouvier et al. |
| 2003/0041211 A1 | 2/2003 | Merkey et al. |
| 2003/0070043 A1 | 4/2003 | Merkey |
| 2003/0088805 A1 | 5/2003 | Manji et al. |
| 2004/0010660 A1 | 1/2004 | Konshak et al. |

FOREIGN PATENT DOCUMENTS

| | | |
|---|---|---|
| JP | 09-305329 A | 11/1997 |
| JP | 09-330184 A | 12/1997 |
| JP | 10-187358 A | 7/1998 |
| JP | 2000-0181805 | 6/2000 |
| JP | 2000-305720 | 11/2000 |
| JP | 2001-019127 | 1/2001 |
| JP | 2001-222385 | 8/2001 |

* cited by examiner

DATA STORAGE DEVICE MANAGEMENT SYSTEM

CROSS-REFERENCES TO RELATED APPLICATIONS

The present application is a continuation application of U.S. patent application Ser. No. 10/370,865, filed Feb. 19, 2003, and is related to and claims priority from Japanese Patent Application No. 2002-259519, filed on Sep. 5, 2002.

BACKGROUND OF THE INVENTION

The present invention relates to data storage system and management thereof.

As noted in Japanese Patent Laid-open Publication No. 2000-305720, a hard disk drive ("HDD") monitoring system with a graphic user interface ("GUI") is used to manage the status of HDD. On the GUI screen, it is possible to display and monitor the following: the HDD RAID group constitution, an HDD including a designated logic unit ("LU"), the RAID group display, and the HDD failure.

As noted in Japanese Patent Laid-open No. 2001-222385, technology for lighting an LED associated with the HDD to give notice of a failure is described. The LED attached to a storage device provides information about the operating status of a HDD. That is, whether the HDD is operating normally or is experiencing problem.

As the number of HDDs installed in disk array devices increases, e.g., 100 or more HDDs, it has become increasingly complicated to replace problematic disks or upgrading older generation of disks. In a single disk array device or storage subsystem, virtually identical disks or HDDs are provided in a matrix of 10-20 rows by 10-20 columns. In addition, the HDDs associated with one RAID group are generally dispersed randomly within the storage device. Accordingly, there is a risk that a maintenance administrator may erroneously remove a wrong HDD and cause an unintended storage failure. Such a risk is unacceptable since the reliability of the disk array devices is paramount. Therefore, it is desirable to provide more reliable means of replacing HDDs provided in the disk array devices.

BRIEF SUMMARY OF THE INVENTION

The present invention relates to storage devices and subsystems and management thereof. One embodiment of the present invention relates to a management method for a storage subsystem that may be implemented in existing storage subsystems without little or no additional hardware, i.e., with mostly software upgrade. Another embodiment of the present invention relates to a service processor or management agent of storage subsystems. Yet another embodiment relates to storage subsystem having locations devices to easily located disk drives to be serviced.

In one embodiment, a method for managing a storage subsystem including a plurality of information recording media includes selecting at least one recording medium from the plurality of information recording media to perform a service to the selected recording medium. A locating device associated with the selected recording medium is activated to identify the location of the selected recording medium in the storage subsystem.

In another embodiment, a method for managing a storage subsystem including a disk array device and a service processor coupled to the disk array device is disclosed. The disk array device includes a plurality of hard disk drives. The method includes selecting a hard disk drive provided in the disk array device; and activating a locating device associated with the selected hard disk drive to provide information about the location of the selected hard disk drive.

In another embodiment, a method for managing a disk array device including a plurality of hard disk drives and a plurality of light emitting devices is described. Each hard disk device is associated with at least one dedicated light emitting device. The method includes displaying a layout map of the hard disk drives provided in the disk array device, the layout map including a plurality of disk representations corresponding to the plurality of hard disk drives provided in the disk array device; selecting one or more of hard disk drives provided in the disk array device using a service processor coupled to the disk array device; and causing one or more light emitting devices associated with the selected one or more hard disk drives to be operated differently from the light emitting devices of the hard disk drives that have not been selected, so that the selected one or more hard disk drives can be easily located in the disk array device.

In yet another embodiment, a computer readable medium including code for managing a storage subsystem including a plurality of information recording media is disclosed. The computer readable medium includes code for selecting at least one recording medium from the plurality of information recording media to perform a service to the storage subsystem; and code for activating a locating device associated with the selected recording medium to provide information about the location of the selected recording medium.

In yet another embodiment, a storage subsystem includes a disk array device including a plurality of hard disk drives and a plurality of light emitting devices, each hard disk drives being associated with at least one dedicated light emitting device; a disk controller coupled to the disk array device to regulate the data flow into and out of the disk array device; and a service processor coupled to the disk controller to manage the storage subsystem, the service processor including a management program that enables a selection of one or more hard disk drives provided in the disk array device that require service and activation of one or more light emitting devices associated with the selected one or more hard disk drives, wherein the one or more light emitting devices are operated differently from light emitting devices of the hard disk drives that have not been selected in order to provide information about the location of the selected one or more hard disk drives.

DETAILED DESCRIPTION OF THE INVENTION

Figure 1:
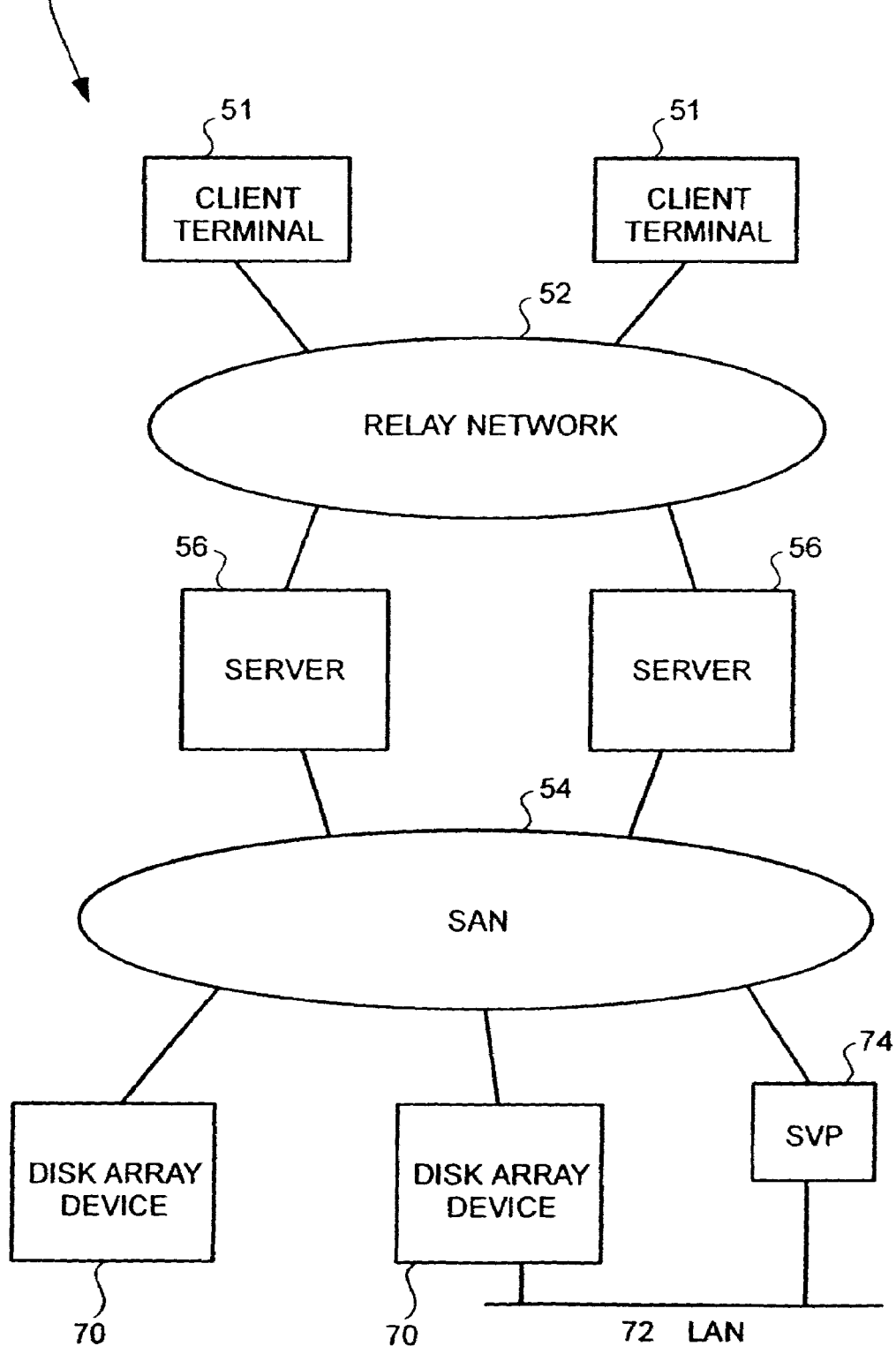
FIG. 1 illustrates a network system including a plurality of storage subsystems according to one embodiment of the present invention.

FIG. 1 schematically illustrates a network system 50 including one or more messaging networks 52 and a storage area network ("SAN") 54 connecting a plurality of servers 56 to a plurality of storage devices or subsystems 70. The network 52 may be a local area network, a wide area network, the Internet, or the like. The network 52 enables, if desired, the storage devices 70 to be centralized and the servers 56 to be clustered for easier and less expensive administration. As used herein, the term "storage subsystem" refers to a storage unit having an integrated collection of one or more storage controllers and one or more storage components (e.g., disk drives) configured to store information.

The SAN 54 supports direct, high-speed data transfers between servers 56 and storage devices 70 in various ways. Data may be transferred between the servers and storage devices. A particular storage device may be accessed serially or concurrently by a plurality of servers. Data may be transferred between servers. Alternatively, data may be transferred between the storage devices 70, which enables data to be transferred without server intervention, thereby freeing server for other activities. For example, a storage device may back up its data to another storage system at predetermined intervals without server intervention.

Accordingly, the storage devices or subsystems 70 is not dedicated to a particular server bus but is attached directly to the SAN 44. The storage subsystems 70 are externalized and functionally distributed across the entire organization.

In one embodiment, the SAN 54 is constructed from storage interfaces and is coupled to the network 52 via the servers 56. Accordingly, the SAN may be referred to as the network behind the server or sub-network.

The network system 50 also includes a service processor or management agent 74 coupled to the SAN according to one embodiment of the present invention. The service processor 74 is a data processing system, e.g., a computer, that is used to monitor the operating status of the storage subsystem and HDDs provided therein and also to perform other management related functions, such as replacing or upgrading HDDs. The service processor 74 includes a display area that provides a graphic user interface ("GUI") that a network administrator can use to manage the storage subsystem.

In one embodiment, the storage device or subsystem 70 is a disk array device including one or more hard disk drives (HDDs) and a disk controller (or a storage controller) that controls the data flow into and out of the disk drives. The service processor 74 is generally coupled to the disk controller. In one embodiment, the service processor is a notebook computer and provided within the same housing as where the disk controller is provided. Accordingly, the service processor 74 may be seen as being included in the storage subsystem 70. However, the service processor is illustrated apart from the storage subsystem 70 in FIG. 1 for purpose for describing the present embodiment. Although the storage subsystem 70 has been described using the SAN environment, it may be provided in other network environment, e.g., a network area storage (NAS) environment.

Figure 2:
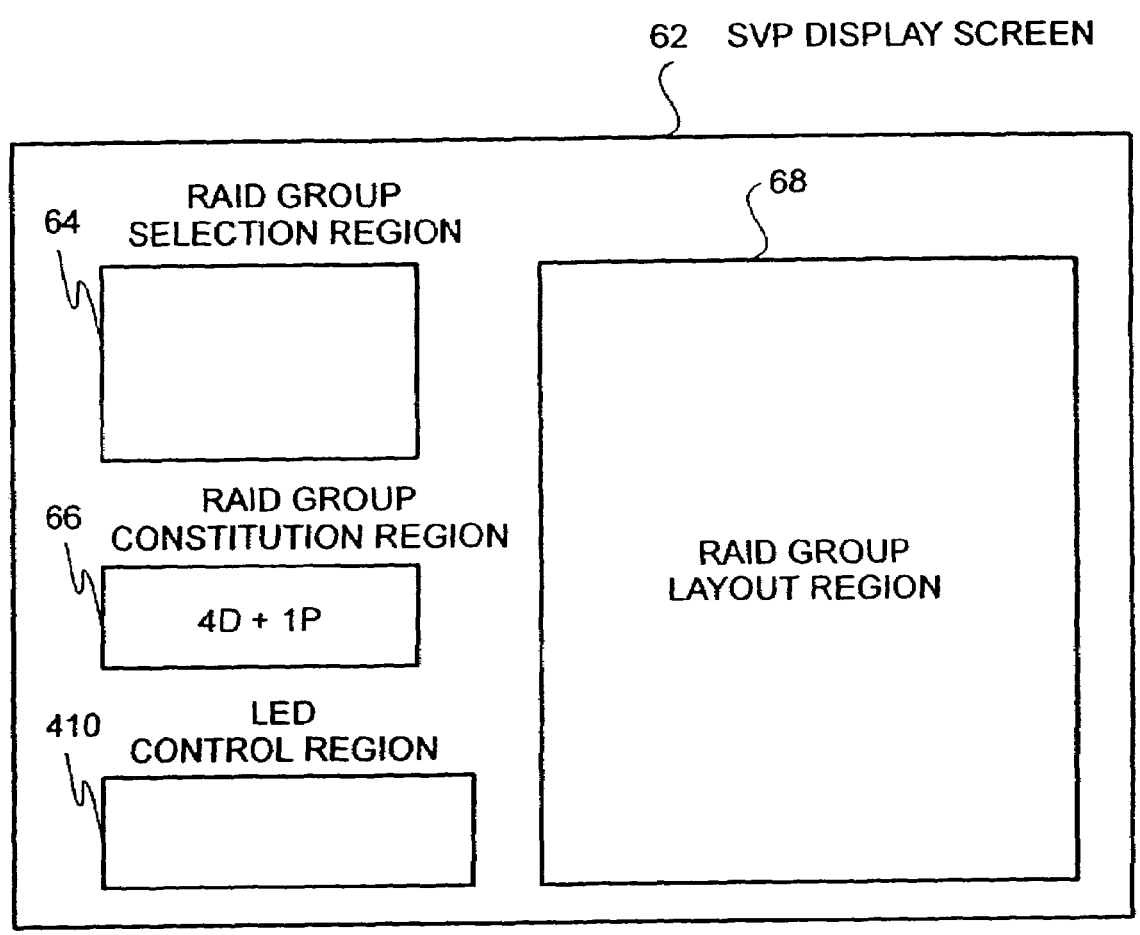
FIG. 2 illustrates a display screen of a service processor that is used to examine the operating status of the HDDs in a storage subsystem according to one embodiment of the present invention.

FIG. 2 illustrates a display screen 62 of the service processor 74 that is used to examine the operating status of the HDDs in a storage subsystem according to one embodiment of the present invention. The display screen includes a Redundant Array of Inexpensive Disks ("RAID") group selection region 64, a RAID group constitution region 66, and a RAID group layout region 68, and an LED control region.

Figure 5:
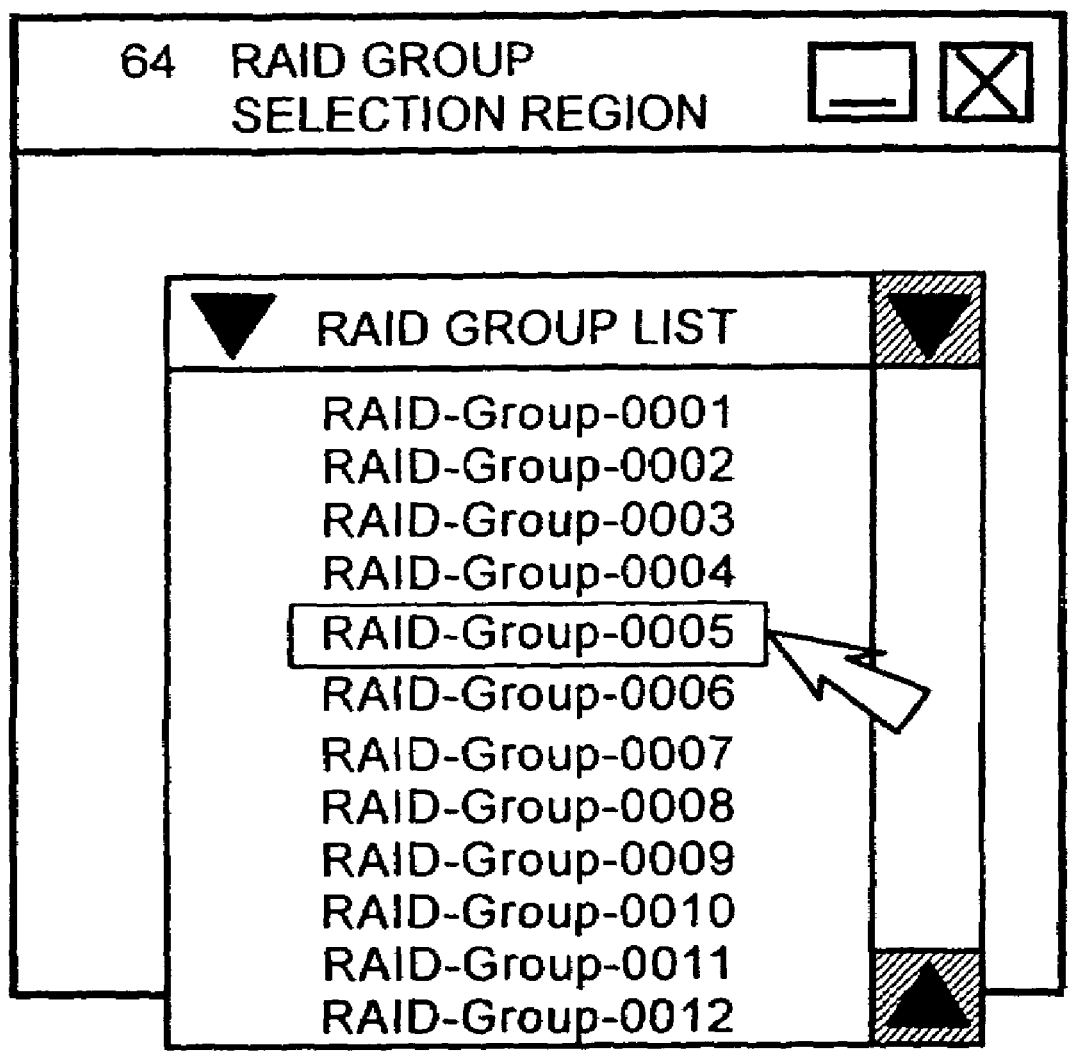
FIG. 5 illustrates an exemplary window for selecting a RAID group using a graphic user interface ("GUI") according to one embodiment of the present invention.

The RAID group selection region 64 is a region where it is possible to select and designate a RAID group. The RAID group selection region 64 is shown in FIG. 5, for example, and is explained below with reference to FIG. 5. The RAID group constitution region 66 provides information regarding the HDDs constituting the selected RAID group using the RAID group selection region 64. For example, as shown in FIG. 5, when the RAID group RAID-Group-0005 is selected in the RAID group selection region 64, the RAID group constitution region 66 indicates that the RAID-Group-0005 comprises four disks and one parity disk, as shown in FIG. 2.

Figure 6:
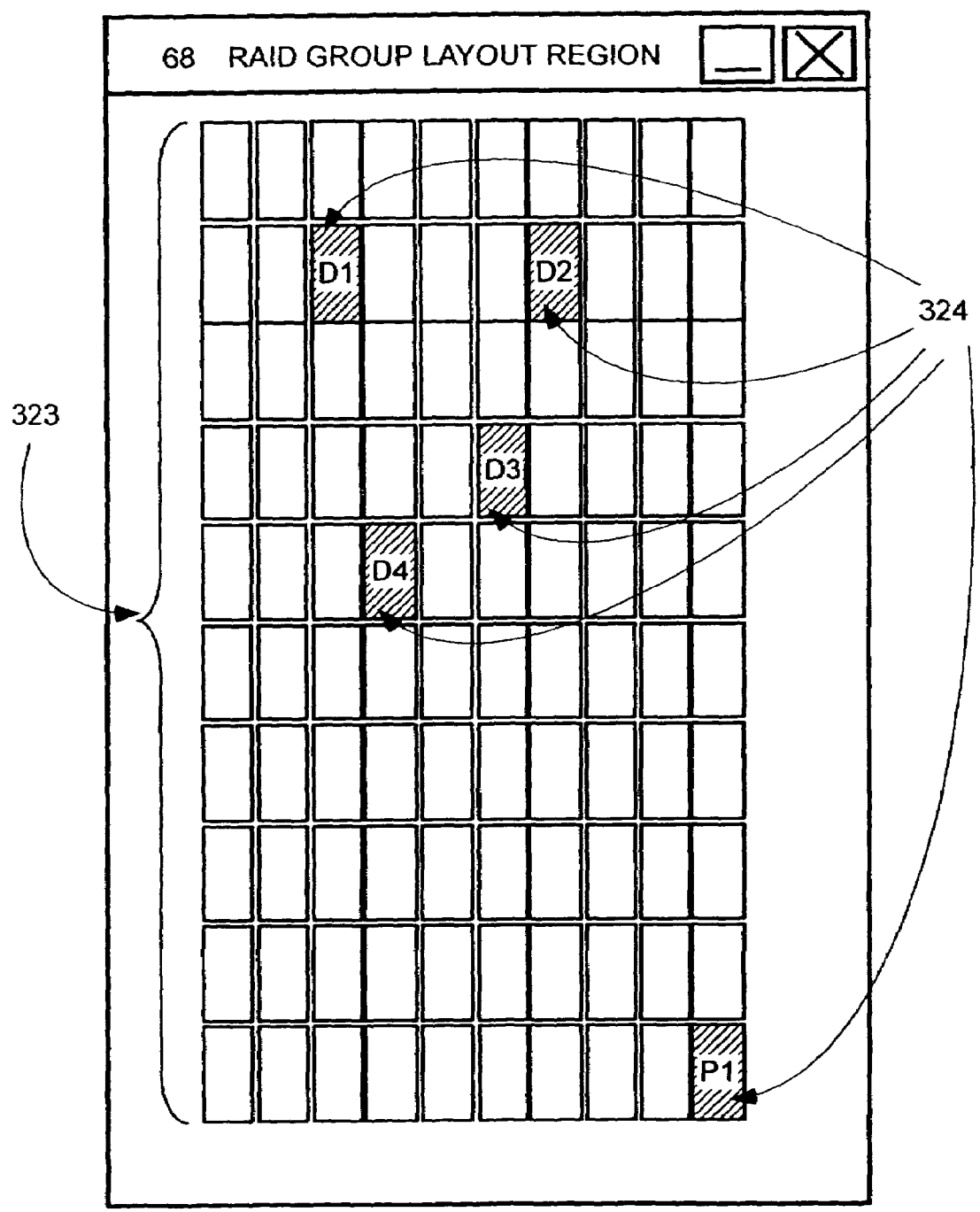
FIG. 6 illustrates an exemplary window showing a RAID group layout diagram showing HDDs that have been selected according to one embodiment of the present invention.

The RAID group layout region 68 displays the layout of the plurality of HDDs in the disk array device 70. The maintenance staff can easily monitor the status of these HDDs by referring to the RAID group layout region 68. A more detailed view of the RAID group layout region 68 is shown in FIG. 6. When a specific RAID group is selected and designated in the selection region 64 by the maintenance staff, the HDDs included in the selected RAID group are highlighted or shown differently from other HDDs, e.g., shown as the shaded HDD blocks 324, in the layout region 68, as will be explained in more details later using FIG. 6.

Figure 8:
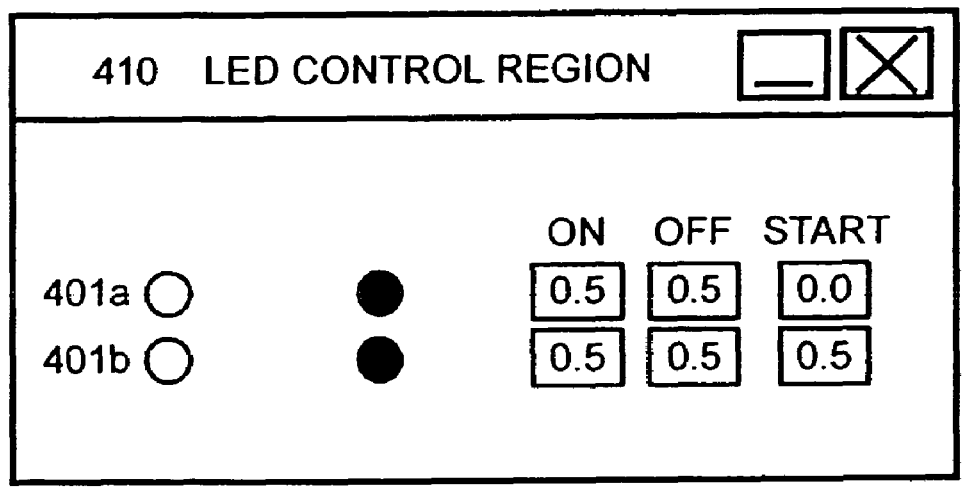
FIG. 8 illustrates an exemplary a window for indicating the LED lighting and blinking method according to one embodiment of the present invention.

The LED control region 410 is used to display the lighting and blinking method of the LED. The LED control region 410 is shown in FIG. 8, for example, and is explained below with reference to FIG. 8.

Figure 3:
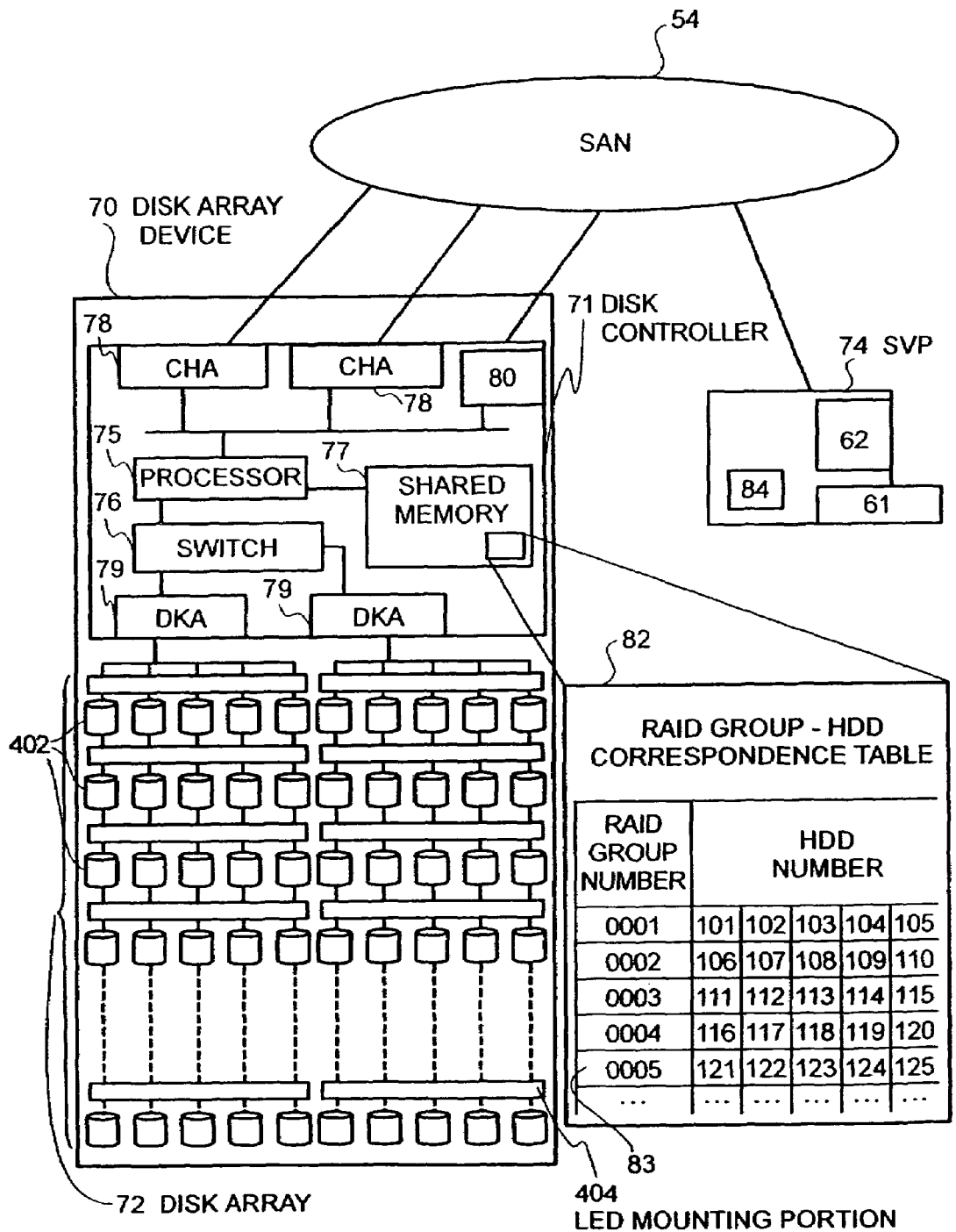
FIG. 3 illustrates a schematic configuration of a disk array device and a service processor according to one embodiment of the present invention.

FIG. 3 illustrates a schematic configuration of the disk array device 70 and SVP 74. The disk array device 70 comprises a disk or storage controller 71 and a disk array 72. The disk controller 71 controls or regulates information being exchanged between a remote device and the disk array 72. The disk controller 71 comprises a processor 75, a switch 76, a shared memory 77, a channel adapter ("CHA") 78, a disk adapter ("DKA") 79, and a SVP connection adapter 80. The processor 75 is connected to the switch 76, memory 77, CHA 78, and SVP connection adapter 80. The processor controls the disk controller 71 and the information being processed therein. The switch 76 is connected to the processor 75 and a plurality of DKAs 79 to enable information to be communicated between these devices. The memory 77 contains a RAID group-HDD correspondence table 82.

The table 82 includes information associating RAID groups to the HDDs, so that data can be route to appropriate storage locations. For example, a row or record 83 in the table 82 indicates that the RAID group 0005 includes or is associated with the HDDs 121, 122, 123 124, and 125. These HDD numbers 121-125 are HDD identification numbers that are assigned to each HDD by the DKA 79 or the like. Generally sequential numbers are used as the identification numbers for convenience. Instead of the memory 77, the correspondence table 82 may be provided on a system disk according to one embodiment. Such a system disk generally includes control information used for the operation of the processor 75. If also provided for the disk controller 71, one or more of the HDDs in the disk array 72 may be used as system disks.

The CHA 78 is connected to the SAN 54 and converts and relays information to be sent and received between the server 56 and disk controller 71 through the SAN 54. The DKA 79 is connected to the disk array 72 and converts and relays information to be sent and received between the disk controller 71 and the disk array 72. The SVP connection adapter 80 is connected to the SAN 54 and converts and relays information to be sent and received between the SVP 74 and the disk controller 71 via the SAN 54. In some embodiments, the SVP 74 is coupled to the disk controller 71 via a local area network ("LAN"), as shown in FIG. 1 The SVP 74 comprises an input device or means 61, such as a keyboard, mouse, or touchpad, a display screen 62, and a storage management program 84 used for managing the HDDs in the disk array 70. The storage management program 84 communicates with the disk controller 71 and displays graphic user interface ("GUI") information on the display screen 62, such as that shown in FIG. 2.

The disk array 72 comprises a plurality of HDDs 402 and an LED mounting portion 404. The plurality of HDDs 402 is connected to the DKA 79 using a fiber channel arbitrated loop or the like and performs data transferring with the DKA 79. The LED mounting portion 404 is connected to the DKA 79 using a signal line; a plurality of LEDs is mounted thereon. The LED mounting portion 404 executes the lighting and blinking of the LEDs mounted thereon, as controlled by the processor 75 according to one embodiment of the present invention.

Figure 4:
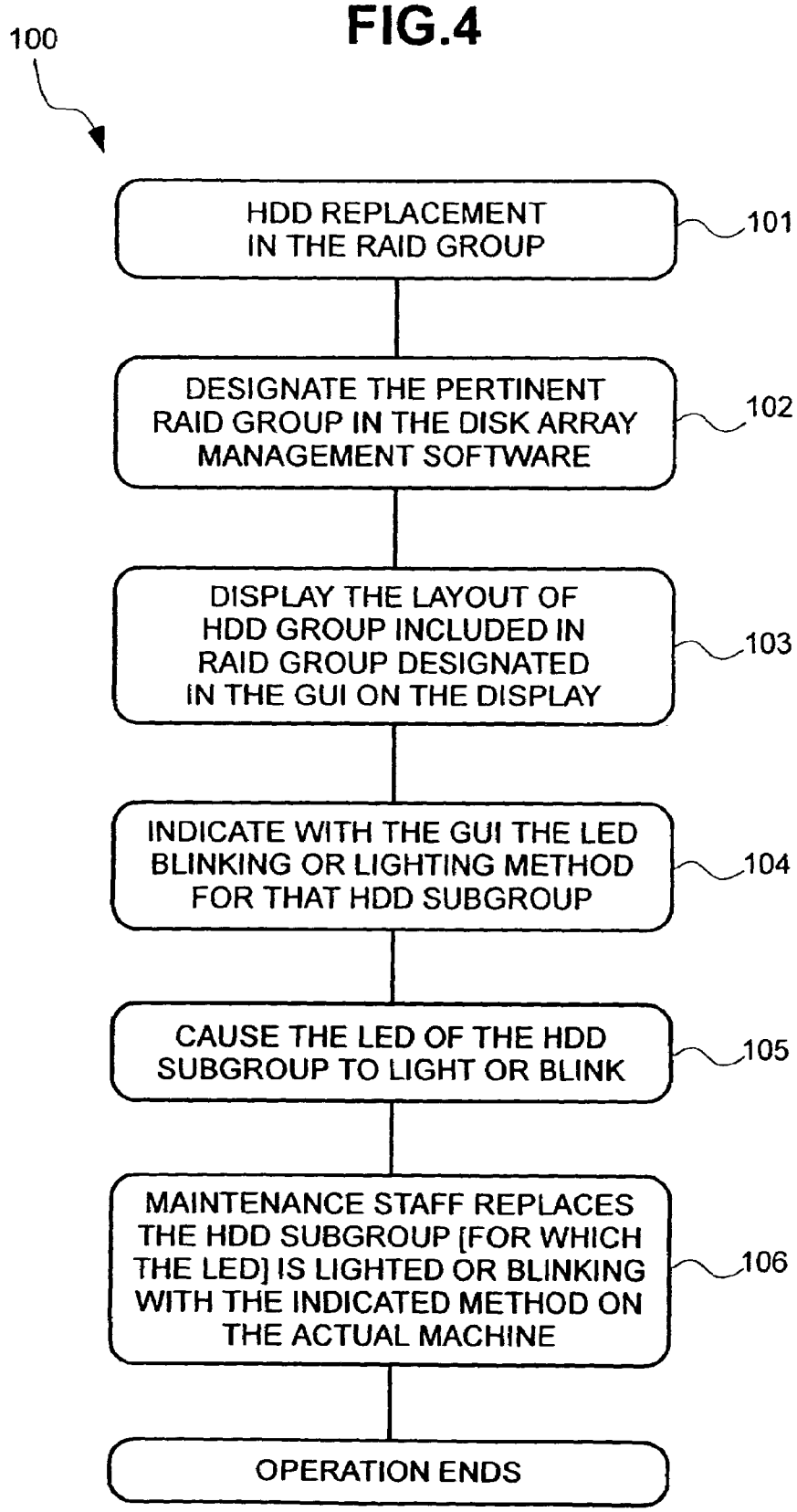
FIG. 4 shows a process for servicing a disk array device according to one embodiment of the present invention.

FIG. 4 is a flowchart 100 illustrating a method of replacing HDDs in the storage subsystem 70 using the service processor 74 according to one embodiment of the present invention. At first, a storage administrator (or maintenance staff) decides that HDDs in a RAID group need to be replaced (step 101). For example, the administrator may wish to replace the HDDs with those having greater capacity or because one or more of the HDDs are experiencing failure.

The maintenance staff selects a pertinent RAID group on the display screen 62 of the SVP 74, operating in a GUI environment, using the input means 61 (Step 102). The selection is made on the RAID group selection region 64, shown in FIG. 5. For example, the RAID-Group-0005 is selected using the selection region 64. In one embodiment, the RAID group list is displayed when the list display button, on the RAID group selection region 64, is pressed using the input means 61, and then the pertinent RAID group is selected from the displayed list.

FIG. 6 illustrates an exemplary RAID group layout region 68. A layout 323 including 10 columns by 10 rows of blocks represents the HDDs provided in the disk array device 70. The blocks corresponding to the HDDs in the RAID-Group-0005 that has been selected above are indicated as numerals 324 and differentiated from other HDDs by displaying the former as shaded blocks. The HDDs 324 comprise 4 data disks and 1 parity disk corresponding to the information provided on the constitution region 66.

As shown, the HDDs 324 are randomly distributed within the disk array device, which complicates the HDD replacement procedure since it would not be easy for the maintenance staff to memorize their exact locations. Consequently, there is a risk that the maintenance staff may erroneously replace a wrong disk and cause a system failure.

One possible solution would be to print the layout map illustrated in FIG. 6 as a reference sheet. However, the storage subsystem may not be provided with a printer. Even with a printed layout map, the replacement operation involves some risk since the disk array device may have 100 or more HDDs that all look substantially identical in a matrix of 10 by 10, or 10 by 20. If a wrong HDD is removed, the system failure or data loss may result, which are highly undesirable since reliability is paramount in the storage technology.

Generally, the disk array device includes a plurality of storage cabinets provided in a vertical alignment. That is, a row of the layout map 323 represents a single storage cabinet. Accordingly, a disk array device having HDDs in a matrix of 10 by 10 has ten storage cabinets that are vertically aligned to each other.

Referring back to the process 100, after step 103, the maintenance staff, on the display screen 62 of the SVP 74, causes the LEDs corresponding to the selected HDDs 324 to emit light in a certain way to differentiate them from the LEDs of other HDDs (Step 104).

Figure 7:
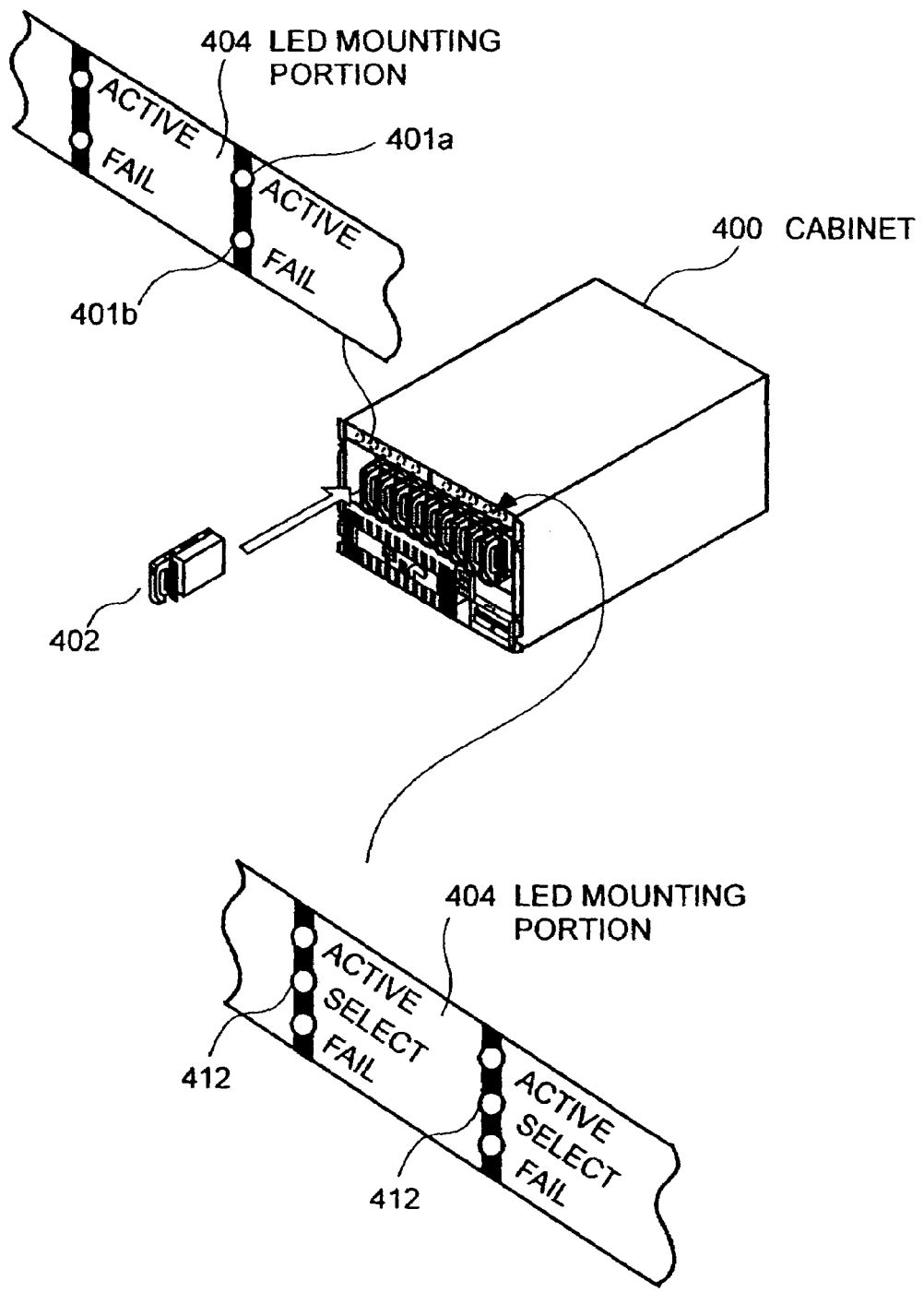
FIG. 7 illustrates a plurality of HDDs provided within a cabinet of a disk array device according to one embodiment of the present invention.

FIG. 7 illustrates a storage cabinet 400 including a plurality of HDDs 402 and an LED section or mounting portion 404. The LED section 404 includes a plurality of LEDs 401a and 401b that indicate the operating status of the HDDs. For example, the LED section 404 includes for each HDD a first LED 401a to indicate whether the corresponding HDD is active and a second LED 401b to indicate whether the corresponding HDD is experiencing failure. The LED section 404 may be provided on the housing of the storage cabinet or on the housing of each of the HDD.

In one embodiment, the LED 401a emits green lights when the power is on; the corresponding LED 401a blinks when the HDD 402 is being accessed. The corresponding LED 401b emits red light when the corresponding HDD is experiencing problem. In step 104 in FIG. 4, the HDDs 324 are differentiated from other HDDs by causing their LEDs to blink. For example, both of the LEDs 401a and 401b are caused to blink at the same time. Alternatively, the LEDs 401a and 401b may blink one of at time, or one LED may blink twice after the other blinks once. In another embodiment, the LED mounting portion 404 includes a third LED 412 for each HDD. The LED 412 is caused to emit light when the corresponding HDD is selected using the selection region 64. The above blinking controls can be made using a GUI environment, i.e., the LED control region 410, provided by the SVP 74.

FIG. 8 shows the LED control region 410 displayed on the display screen 62 of the SVP 74. An embodiment of making the instructions regarding the LED display is explained next using FIG. 8. The maintenance staff uses the input means 61 and indicates the lighting and blinking method for the LEDs 401a and 401b displayed on the LED control region 410. For example, the maintenance staff selects blinking method for the LED 401a, instructs the blinking time for both on and off states to be 0.5 seconds, and the start time to be 0 seconds. Similarly, the LED 401b is caused to blink in a particular way, i.e., the blinking time is 0.5seconds. In order for these LEDs to blink alternately, the start times for each is offset 0.5 second. In one embodiment, a default blinking method is used when a given RAID group is selected for maintenance and step 104 is not performed.

Once the LED blinking method has been selected, an appropriate program causes the LEDs 401a and 401b corresponding to the HDDs of the selected RAID to blink accordingly (Step 105). In one embodiment, this function is performed by a program stored in the processor 75 or in a processor mounted in the CHA 78. The storage management program 84 of the SVP 74 fetches the instructions regarding LED lighting and blinking through the input means 61 and LED control region 410 on the display screen 62, and notifies the processor 75 in the disk controller 71 of the information relating to such instructions. The processor 75 in the disk controller 71 fetches information related to instructions regarding the LED lighting and blinking and sends a control signal regarding LED lighting and blinking to the LED mounting portion 404 through the DKA 79 in the disk controller 71. The LEDs installed in the LED mounting portion 404 light and blink according to the control signal for LED lighting and blinking.

The LEDs corresponding to an HDD group included in a designated RAID group on an actual machine are caused to be displayed, so as to be differentiated from LEDs corresponding to other HDD groups. Therefore, the maintenance staff can replace the desired HDDs according to the LED lighting and blinking method (Step 106). In this way, the maintenance staff is prevented from erroneously removing wrong HDDs, as can be appropriated from FIG. 9.

Figure 9:
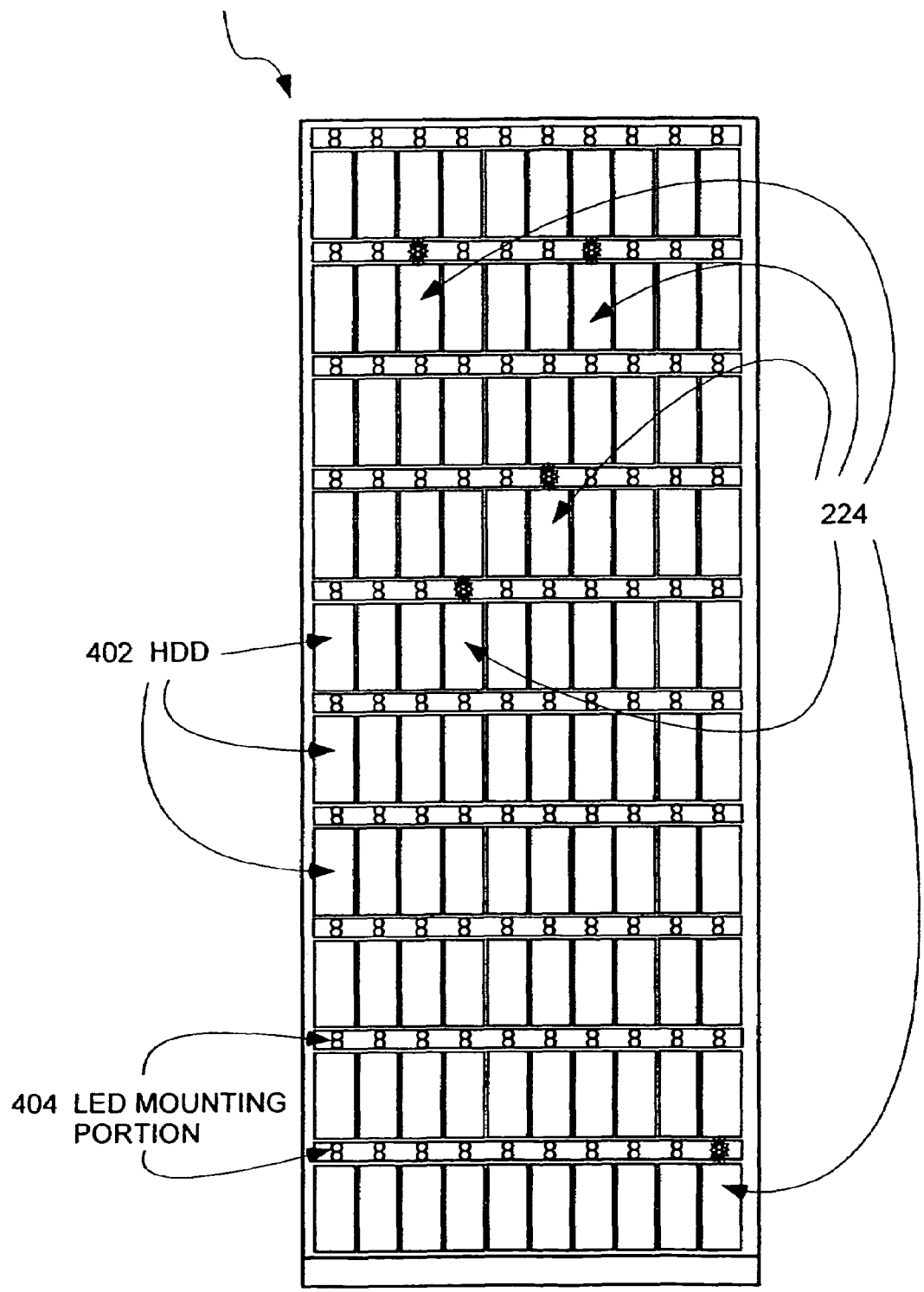
FIG. 9 illustrates a schematic diagram of a disk array device with LEDs caused to blink using the window of FIG. 8 to facilitate servicing of the disk array device according to one embodiment of the present invention.

FIG. 9 illustrates a disk array device 70 including LEDs corresponding to the HDD layout 323 of in FIG. 6. The disk array device 70 comprises a plurality of HDDs 402 including HDDs 224 corresponding to the selected HDDs blocks 324 in FIG. 6. The LEDs of the HDDs 224 are blinking according to the controls set on the LED control region 410. Consequently, the maintenance staff easily identifies the HDDs 224 and performs the HDD replacement operation without mistakes.

Figure 10:
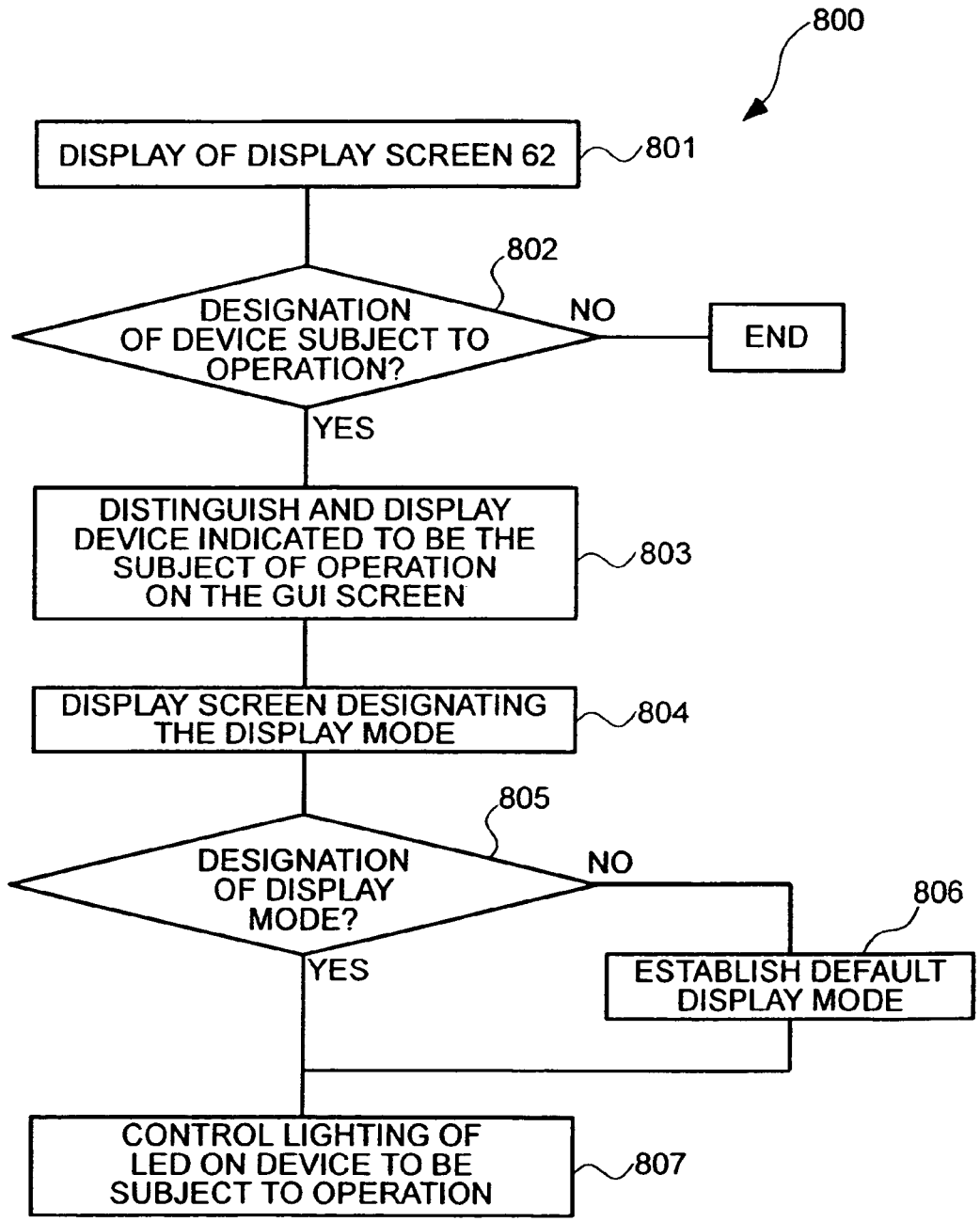
FIG. 10 is a flowchart showing a method of servicing a disk array device using a GUI display screen according to one embodiment of the present invention.
Figure 11:
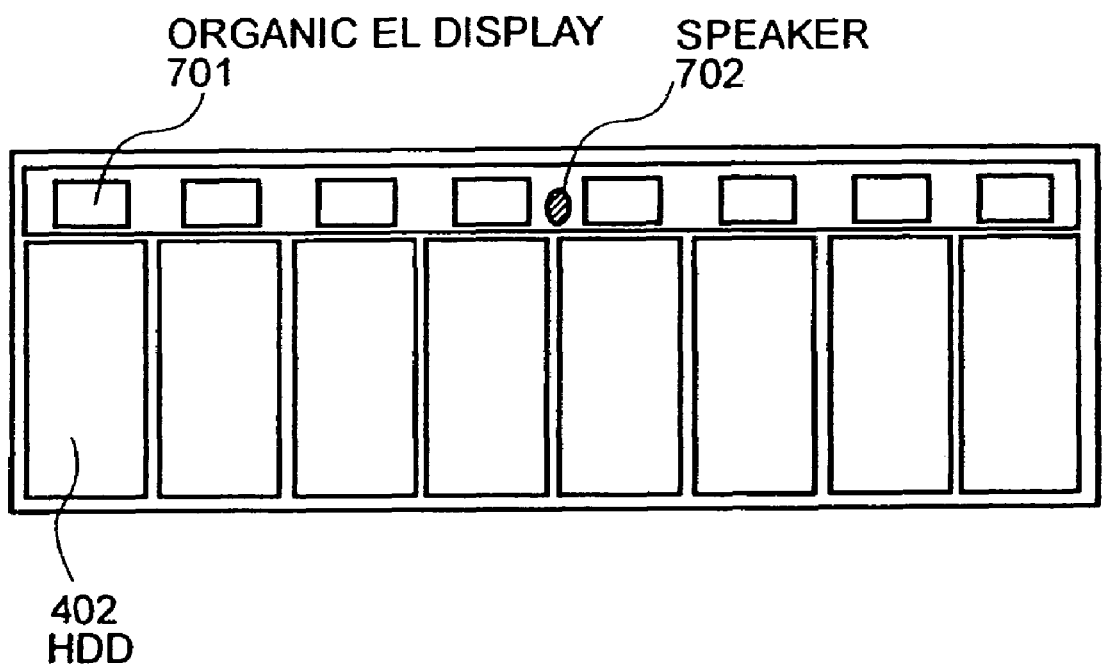
FIG. 11 shows a disk array device having organic EL displays and speakers to facilitate servicing of the disk array device according to one embodiment of the present invention.

FIG. 10 illustrates a process 800 for operating the storage management program 84 of the SVP 74. The storage management program 84 requests layout information for HDDs in the disk array device 70 from the disk array controller 71 through the SVP connection adapter 80. The processor 75 in the disk array controller 71 collects the HDD layout information using the DKA 79 or the like and transmits the information to the storage management program 84. This HDD layout information includes the total number of RAID groups in the disk array device 70 and/or information of the constitution of each of the RAID groups. When the storage management program 84 receives the HDD layout information, the layout is displayed on the display screen 62 (Step 801). The display screen 62 includes the RAID group selection region 64, the RAID group constitution region 66, and the RAID group layout region 68. Next, the storage management program 84 determines whether or not a device subject to operation (e.g., a RAID group) is selected on the RAID group selection region 64 (Step 802). In one embodiment, one or more HDDs may be selected directly including those in different RAID groups.

When a device subject to operation is designated on the RAID group selection region 64, the storage management program 84 requests information regarding the device subject to operation from the disk controller 71. For example, as shown in FIG. 5, when the RAID-Group-0005 in the RAID group selection region 64 is selected by the maintenance staff, the storage management program 84 requests layout information for the HDDs included in the RAID-Group-0005 from the disk controller 71. The processor 75 in the disk controller 71 accesses the RAID group-HDD correspondence table 82 and provides the HDD layout information to the storage management program 84.

Upon receipt of the HDD layout information, the storage management program 84 determines (or is informed) that the HDDs associated with the RAID-Group-0005 are HDDs 121-125. The storage management program 84 displays the HDD numbers 121-125 as shaded blocks on the RAID group layout region 68 to differentiate them from other HDD blocks (Step 803). The shaded layout blocks 324 are shown in FIG. 6.

The storage management program 84 displays a screen for designating the LED display mode (Step 804). The screen for designating the LED display mode is the LED control region 410 shown in FIG. 9; and the LED blinking mode is selected by the maintenance staff. The storage management program 84 determines whether or not the LED blinking mode has been selected (Step 805). If the display mode has not been selected within a given time period, a default display mode is implemented (Step 806). The storage management program 84 transmits the display mode information to the disk controller 71. The processor 75 in the disk controller 71 receives the display mode information and causes the LEDs to blink accordingly (Step 807).

Using the storage management program 84, the LEDs provided at a close proximity to the HDDs can be controlled to emit light accordingly to the instructions from the maintenance staff as discussed above.

In another embodiment, a display device is provided on the housing of the storage cabinet, rather than LEDs, to identify the selected HDDs. For example, an organic electroluminescent display 701 is provided for each HDD. The display 701 provides the maintenance staff with a greater flexibility in the methods used to identify the selected HDDs since words, symbols, or pictures may be displayed on the display 701. As a secondary or precautionary tool, a speaker 702 may be provided on the storage cabinet or the disk array device to provide verbal instructions in addition to the visual aid provided by the display 701.

Alternatively, the speaker 702 may be used as a primary tool in identifying the selected HDDs. For example, each HDD is provided with a unique identification number and the speaker states the identification number of the selected HDDs to assist the maintenance staff in safely locating the HDDs.

The above embodiments also may be used to remove and insert HDDs in a particular order if such a procedure is desired. In such a case, HDDs are inserted in an add-on cabinet, for example. HDDs having a SCSI enclosure service function and an enclosure service interface function must be inserted in advance of other HDDs. This is because communication between the base cabinet and the add-on cabinet becomes possible with these HDDs as communication terminals when HDDs having these functions are inserted first. For these situations, the LEDs of selected HDDs are caused to blink in a given order using the display screen 62. For example, only the LEDs of the HDD to be removed first are caused to blink initially. Once this HDD has been removed, the LEDs of the next HDD to be removed are caused to blink, so on. If the display 701 is used, the display may show the order of HDD removal using sequential numbers for each of the selected HDDs.

The above detailed descriptions are provided to illustrate specific embodiments of the present invention and are not intended to be limiting. Numerous modifications and variations within the scope of the present invention are possible. For example, in one embodiment, the RAID group-HDD correspondence table 82 is provided within the SVP 74. The embodiment of the present invention may be used for storage components other than RAID groups, including logical units ("LU"), one or more HDDs, a HDD group included in a LU, and one or more RAID groups in a LU. The embodiments of the present invention can also be used to transport one or more HDDs in from one disk array device 70 to another disk array device 70. In such a case, the LEDs corresponding to the both source and destination locations may be caused to blink accordingly. Accordingly, the present invention is defined by the appended claims.

What is claimed is:

1. A disk array system, comprising:
   at least one first interface coupled to an information processing device and configured to receive data sent from said information processing device;

at least one memory coupled to said first interface and being used to temporarily store data;

at least one first processor coupled to said first interface and configured to transfer data received in said first interface to said memory;

at least one second interface coupled to said memory and configured to transfer data from said memory under control of said first processor;

a plurality of disk drives configured to store data transferred from said second interface;

a plurality of lighting devices corresponding to each of said disk drives and being used to indicate state of each of said disk drives; and a display device displaying information related to said disk drives and displaying a selection made by a user of a disk drive group including some of said disk drives, wherein said plurality of lighting devices related to said disk drive group is configured to blink in an order designated by said user.

2. The disk array system according to claim 1, further comprising at least one second processor configured to:

recognize said disk drive group selected by said user;

detect said lighting device related to said disk drive group; and control blinking of said lighting device.

3. The disk array system according to claim 1, wherein said first processor is configured to:

recognize said disk drive group selected by said user;

detect said lighting device related to said disk drive group; and control blinking of said lighting device.

4. The disk array system according to claim 1, further comprising:

a table stored in said memory, said table having information of both said disk drive group and said disk drives related to said disk drive group.

5. The disk array system according to claim 1, wherein:

said memory has information of both said disk drives and said lighting device.

6. The disk array system according to claim 1, wherein:

said display device is further configured to display information related to an instruction for stopping said lighting device from blinking.

7. The disk array system according to claim 1, wherein:

said lighting device comprises a light-emitting diode (LED).

8. The disk array system according to claim 1, further comprising:

a plurality of cabinets comprising said disk drives, wherein said disk drives are stacked.

9. The disk array system according to claim 1, further comprising:

a plurality of cabinets comprising said disk drives and said lighting device, wherein each of said cabinets is stacked, wherein said lighting device comprises a light-emitting diode (LED).

10. The disk array system according to claim 1, wherein:

said disk drive group comprises a RAID (Redundant Array of Inexpensive Disks) group.

11. The disk array system according to claim 1, wherein:

said disk drive group comprises a group in which some of said disk drives relate to a logical unit, wherein said logical unit is used as a logical storage space for writing data in said disk array system by said information processing device.

12. The disk array system according to claim 1, wherein:

said display device is configured to display information by using a graphical user interface (GUI).

13. The disk array system according to claim 1, further comprising:

a table comprising information of both said disk drive group and said some of said disk drives related to each of said disk drive groups, wherein said disk drive group comprises a plurality of disk drive groups.

14. The disk array system according to claim 1, further comprising:

at least one FC-AL (Fibre Channel Arbitrated Loop) coupled to said second interface and said disk drives.

15. The disk array system according to claim 1, wherein said plurality of lighting devices is configured to blink in a given order, when their corresponding disk drives are to be removed or inserted in said given order.

16. The disk array system according to claim 15, wherein one of said plurality of lighting devices, which corresponds to a first disk drive to be removed, blinks first and then, after completion of removal of the first disk drive, another one of said plurality of lighting devices which corresponds to a second disk drive to be removed, subsequently blinks to indicate a next removal.

17. The disk array system according to claim 15, wherein one of said plurality of lighting devices, which corresponds to a first disk drive to be inserted, blinks first and then, after insertion of the first disk drive is completed, another one of said plurality of lighting devices, which corresponds to a second disk drive to be inserted, subsequently blinks to indicate a next insertion.

18. The disk array system according to claim 12, wherein the designation of the order for said plurality of lighting devices to blink is received via said GUI.

19. The disk array system according to claim 1, further comprising a speaker to output an audio guidance relating to the order for said plurality of lighting devices to blink.

20. The disk drive according to claim 1, wherein the display device displays information regarding the order designated by the user.

21. A disk array system, comprising:

at least one first interface coupled to an information processing device and configured to receive data sent from said information processing device;

at least one memory coupled to said first interface and being used to temporarily store data;

at least one first processor coupled to said first interface and configured to transfer data received in said first interface to said memory;

at least one second interface coupled to said memory and configured to transfer data from said memory under control of said first processor;

a plurality of disk drive units each having at least one disk drive configured to store data transferred from said second interface;

a plurality of lighting devices corresponding to each of said disk drive units and being used to indicate state of each of said disk drive units; and a display device displaying information related to said disk drives and displaying a selection made by a user of a disk drive group including some of said disk drives, wherein said plurality of lighting devices related to said disk drive group of some of said disk drives is configured to blink in an order designated by said user.

* * * * *